United States Patent [19]

Credle

[11] 4,445,539

[45] May 1, 1984

[54] DIP TUBE AND VALVE WITH QUICK-DISCONNECT COUPLING FOR A COLLAPSIBLE CONTAINER

[75] Inventor: William S. Credle, Stone Mountain, Ga.

[73] Assignee: The Coca-Cola Company, Atlanta, Ga.

[21] Appl. No.: 256,696

[22] Filed: Apr. 23, 1981

Related U.S. Application Data

[62] Division of Ser. No. 58,866, Jul. 19, 1979, Pat. No. 4,286,636.

[51] Int. Cl.[3] .............................................. F16L 37/28

[52] U.S. Cl. .......................... 137/614.03; 137/614.05; 251/149.6; 251/DIG. 3

[58] Field of Search ........... 251/DIG. 3, 149.6, 149.7; 137/614.01, 614.02, 614.03, 614.04, 614.05

[56] References Cited

U.S. PATENT DOCUMENTS

| | | | |
|---|---|---|---|
| 2,730,380 | 1/1956 | Espy et al. | 137/614.04 |
| 3,063,461 | 11/1962 | Rudolph | 251/DIG. 3 |
| 3,174,508 | 3/1965 | Zahuranec | 137/614.04 |
| 3,334,659 | 8/1967 | Magorien | 251/149.6 |
| 3,902,516 | 9/1975 | Rudolph | 137/512 |
| 4,150,696 | 4/1979 | Meier et al. | 251/DIG. 3 |
| 4,286,636 | 9/1981 | Credle | 251/149.6 |

*Primary Examiner*—A. Michael Chambers

*Attorney, Agent, or Firm*—Birch, Stewart, Kolasch & Birch

[57] ABSTRACT

The present invention is directed to a dip tube and valve with a quick-disconnect coupling for use in combination with a collapsible bag to dispense a liquid product therefrom. The dip tube is extruded or otherwise formed from plastic or other suitable materials and includes at least one channel in the peripheral surface thereof extending along the entire length of the dip tube. As a vacuum or suction is applied to the dip tube by a pump, initially all of the air within the collapsible bag is extracted therefrom. Subsequently, the liquid product is dispensed out of the collapsible bag and the bag collapses around a portion of the dip tube which is no longer surrounded by the liquid product. Progressively, as the liquid product is removed, the bag will continue to collapse around the dip tube, and the liquid product will continue to flow through the longitudinal channel of the tube until the contents of the collapsible bag are exhausted. The collapsible bag has a fitment or spout to which a valve with a quick-disconnect coupling is connected. The dip tube may be mounted in either the bag fitment or the valve. The quick-disconnect coupling of the valve is adapted to receive a mating coupling from the hose socket of a dispensing hose. When the respective couplings are engaged the valve is biased in an open position. The valve is normally biased to a closed position when the couplings are not engaged.

9 Claims, 14 Drawing Figures

TO PUMP & DISCHARGE

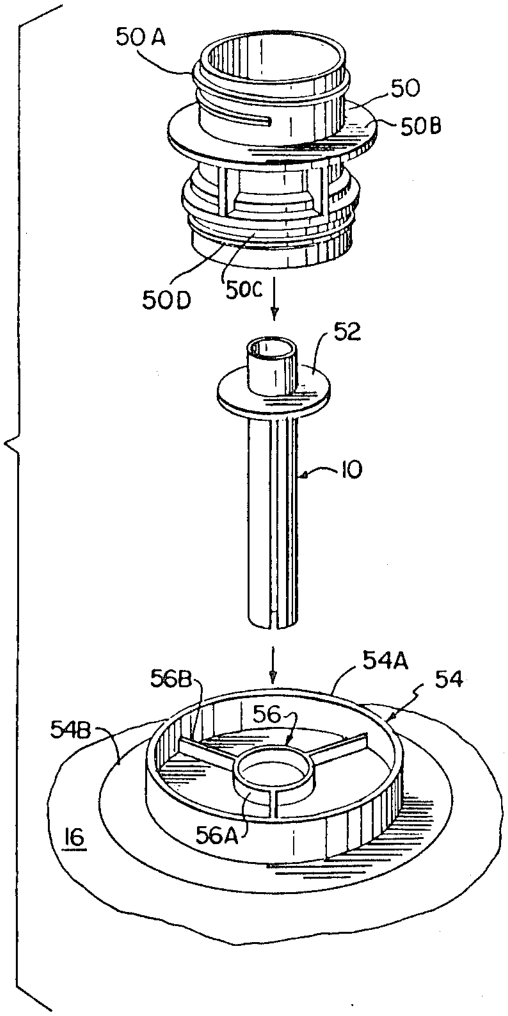
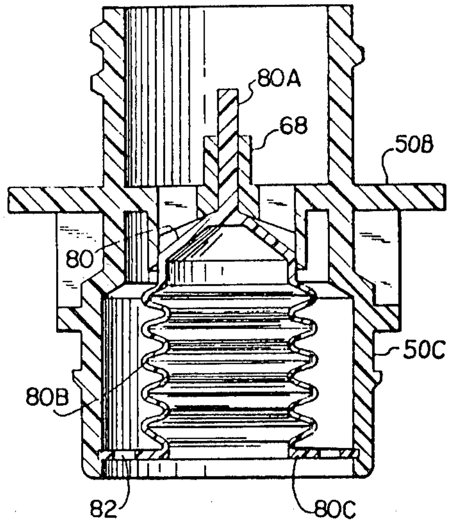
FIG. 11
FIG. 7

FIG. 9A
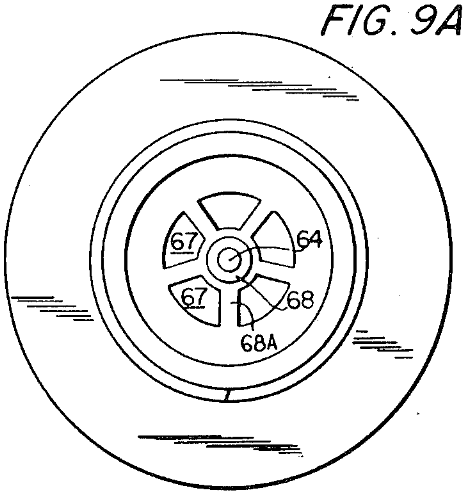
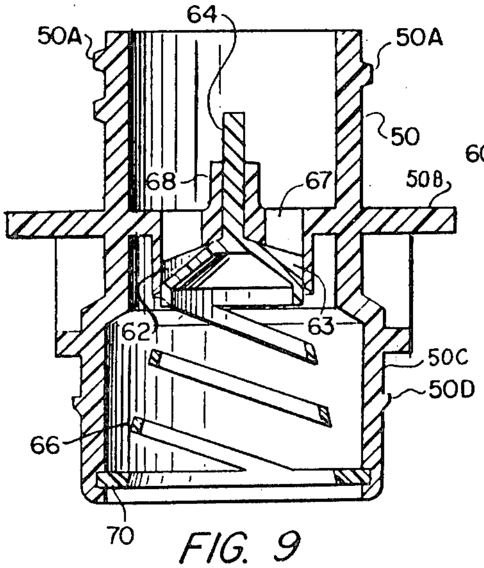
FIG. 9
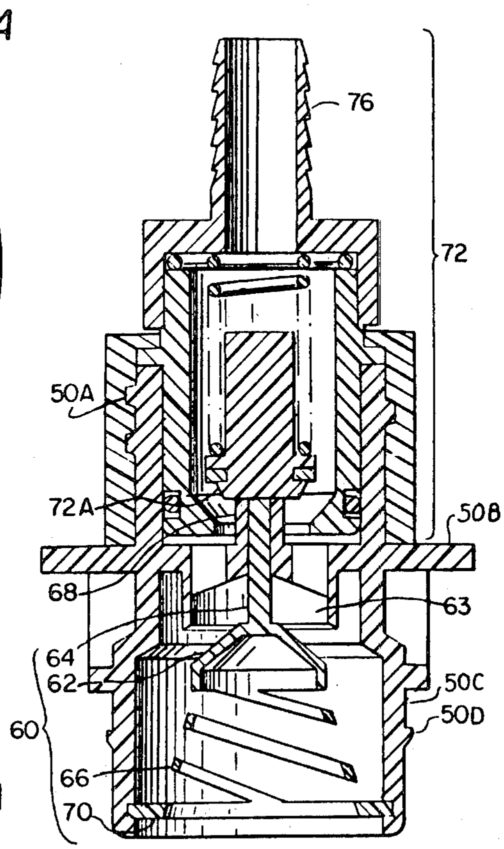
FIG. 10

DIP TUBE AND VALVE WITH QUICK-DISCONNECT COUPLING FOR A COLLAPSIBLE CONTAINER

This application is a divisional of copending application Ser. No. 058,866, filed on July 19, 1979, now U.S. Pat. No. 4,286,636, issued Sept. 1, 1981.

BACKGROUND OF THE INVENTION

1. Field of the Invention

The present invention relates to a dip tube and valve with a quick-disconnect coupling for use in combination with a collapsible, sealed container to dispense a liquid product therefrom.

2. Description of the Prior Art

Many exemplary dip tubes are available in the prior art which permit the extraction of a product from a container. The most conventional dip tube is an elongated cylindrical tube which includes an upper portion connected to a valve and an open lower portion positioned within the product to be extracted from the container. For example, Daniels, U.S. Pat. No. 3,171,571, discloses a conventional bag-in-box type of dispensing package including a dip tube 13.

Another example of a dip tube positioned within a flexible bag is disclosed by Kramer et al, U.S. Pat No. 2,859,899. The dip tube includes perforations 38 through which syrup or other material positioned within the flexible bag is sucked therefrom by means of a pump.

U.S. Pat. No. 2,133,411 to Zohe discloses a baby nursing bottle including a rigid member 12 which precludes the bending of the flexible bag 4 thus preventing the sealing off of the aperture at the top end of the bottle through which the milk is sucked.

It is conventional in the pressurized container industry to position a dip tube within an aerosol container for dispensing the product therethrough. A number of exemplary dip tubes are illustrated in the prior art which are used within pressurized containers. For example, Roth et al, U.S. Pat. No. 3,245,582; Micallef, U.S. Pat. No. 3,257,036; Venus, U.S. Pat. No. 3,791,557; Stewart, U.S. Pat. No. 3,388,832; Harris et al, U.S. Pat. No. 4,062,475; and Petterson, U.S. Pat. No. 4,087,026 all disclose dip tubes positioned within an aerosol container. These conventional dip tubes are designed to dispense a product by means of a pressurized source which pushes the product through the dip tube.

SUMMARY OF THE INVENTION

Accordingly, it is a primary object of the present invention to provide a dip tube which includes one or more channels in the periphery thereof, extending along substantially the entire length of the dip tube, for use in combination with a collapsible, sealed container to dispense a liquid product therefrom.

It is another object of the present invention to provide a dip tube which may be inexpensively extruded at a cost substantially less than known techniques.

A further object of the present invention is to provide a dip tube which permits a flexible bag to collapse thereon while still enabling a product to be dispensed therefrom.

The objects of the present invention are fullfilled by providing an elongated dip tube which includes at least one channel in the periphery thereof which extends along the entire length of the dip tube. The tube is positioned within a collapsible bag and a vacuum or suction is applied at the upper end thereof. Initially, air within the collapsible bag will be drawn therefrom. Subsequently, the liquid product disposed within the collapsible bag will flow through the channel in the dip tube and the collapsible bag will collapse around the outer circumference of the dip tube. Progressively, as the liquid product is removed from the collapsible bag, the bag will continue to collapse on the outer circumference of the dip tube until all of the liquid product is dispensed therefrom.

A major advantage of the dip tube of the present invention is that it will allow the bag to be emptied regardless of the bag's orientation, namely, with the bag spout on the top, bottom or side of the bag.

Further scope of applicability of the present invention will become apparent from the detailed description given hereinafter. However, it should be understood, that the detailed description of the invention and the specific examples, while indicating preferred embodiments of the invention are given by way of illustration only, since various changes and modifications within the spirit of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is an exploded view of an alternative embodiment of an assembly for retaining the dip tube of the present invention within the spout of a container;

FIGS. 9 and 10 are cross-sectional views of one embodiment of a valve member which may be used in the bag couplings of FIG. 1 or 8, FIG. 9 illustrating the valve in a closed position and FIG. 10 illustrating the valve in an open position;

FIG. 9A is a top plan view of the embodiments of FIGS. 9 and 10;

FIG. 11 is a cross-sectional view illustrating another embodiment of a valve member suitable for use in connection with the present invention;

DETAILED DESCRIPTION OF THE INVENTION

The present invention is directed to a dip tube for use in combination with a collapsible, sealed container to dispense a liquid product therefrom. The dip tube of the present invention may be used in combination with a Post-mix beverage system. Such a Post-mix beverage system, which is hereby incorporated by reference, is disclosed in U.S. Pat. No. 4,104,461, issued Mar. 29, 1977 to Harvill and assigned to the same assignee as the present invention.

Figure 1:
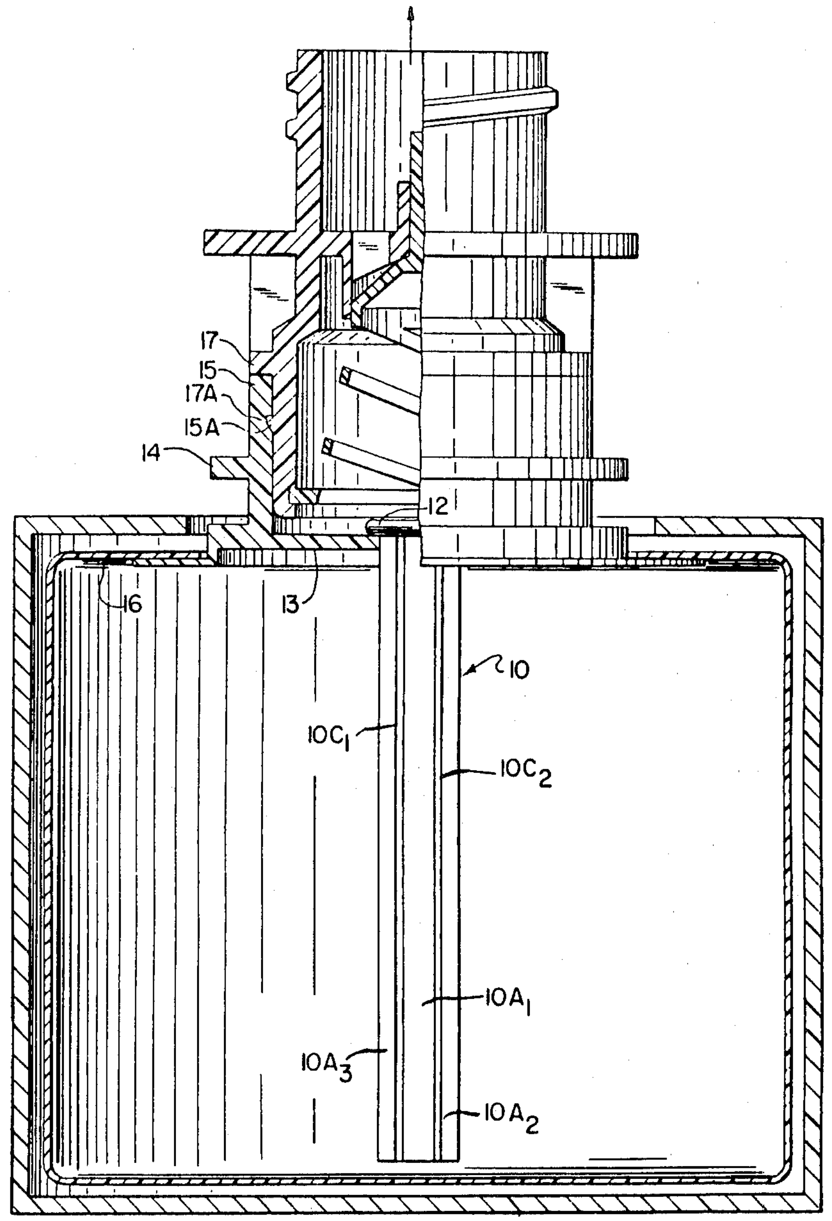
FIG. 1 is a partial cross-sectional view of a collapsible bag including a bag fitment to which the dip tube of the present invention is attached.
Figure 6:
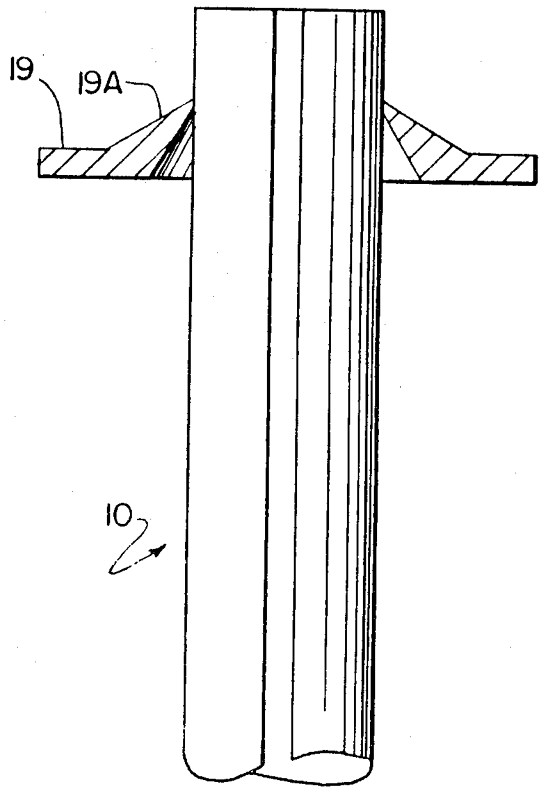
FIG. 6 is a perspective view of the dip tube according to the present invention including a washer for attaching the dip tube to a collapsible, sealed container.

As illustrated in FIG. 1, a dip tube 10 may include a deformed end 12 for attachment to a bag fitment 14. However, the dip tube 10 according to the present invention may be attached to a collapsible, sealed container 16 by means of a variety of different attachment members. For example, as illustrated in FIG. 6, a washer 19 may be positioned on the dip tube 10 for attachment to the bag fitment 14. The washer 19 includes an inwardly projecting lip 19A which permits sliding movement of the washer 19 on the dip tube 10 in one direction only. Therefore, after the washer 19 is correctly positioned on the dip tube 10 and the dip tube is inserted into the collapsible, sealed container 16 to abut against the bag fitment 14, the dip tube 10 will be properly positioned within the collapsible, sealed container 16.

The bag fitment 14 in one embodiment includes a substantially horizontal wall portion 13 to which the deformed end 12 or the washer 19 is securely affixed to prevent lateral movement of the dip tube 10 within the collapsible, sealed container 16.

The bag fitment 14 includes an upwardly projecting circular wall 15 adapted to be engaged by a valve attachment member 17. As illustrated in FIG. 1, the upwardly projecting circular wall 15 may include serrations 15A, which are engaged by corresponding serrations 17A on the coupling 17, to lock the two members relative to each other.

In one contemplated use of the present invention, the dip tube 10 may be disposed within a collapsible, sealed container 16 positioned within a box 18. This arrangement is commonly referred to as a bag-in-box. As a vacuum or suction is supplied to the dip tube 10 through the valve member by means of a pump, initially all of the air within the collapsible, sealed container 16 is discharged therefrom. Subsequently, the liquid product contained in the sealed container 16 will begin to flow upwardly through the dip tube 10 to be discharged therefrom and supplied to a discharge spout, not illustrated in the drawings. As the liquid product is discharged from the collapsible, sealed container 16, the container will collapse onto the dip tube because of the suction applied by the pump. Normally, the collapsing of the collapsible, sealed container in this manner usually clogs the dip tube opening of a conventional, prior art dip tube and prohibits further dispensing of the product disposed within the collapsible, sealed container.

The dip tube 10, according to the present invention, overcomes the disadvantages of the prior art by providing at least one channel in the peripheral surface thereof extending along substantially the entire length of the dip tube. Therefore, as the liquid product is dispensed out of the collapsible, sealed container 16, the container collapses around a portion of the dip tube 10, which is no longer surrounded by the liquid product leaving the remaining portion of the channel open to permit the complete dispensing of all the liquid product contained within the collapsible, sealed container 16.

Figure 2:
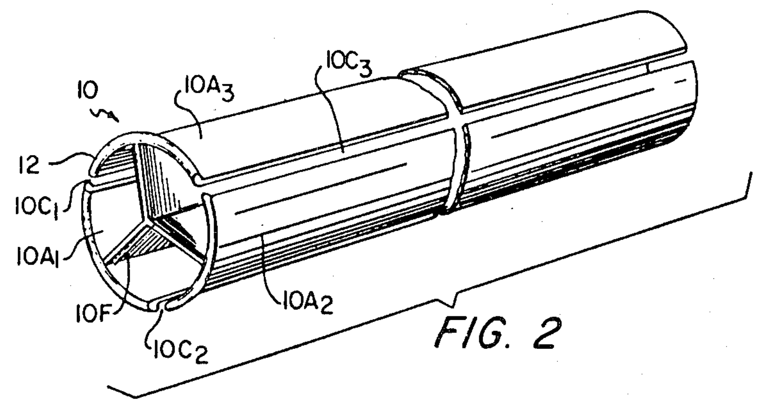
FIG. 2 is a perspective view of a first embodiment of the dip tube according to the present invention.

FIGS. 1 and 2 illustrate a preferred embodiment of the dip tube according to the present invention. The dip tube 10 includes three channels 10C$_1$–10C$_3$ which provide passageways for the liquid product positioned within the collapsible, sealed container to be sucked therefrom. The frame 10F includes three arms connected at one end thereof and projecting outwardly from the connection. The other end of each of the arms is connected to skirt members 10A$_1$–10A$_3$ which are spaced relative to each other to form channels 10C$_1$–10C$_3$ therebetween. The distance between the skirt members which form the channels may be increased or decreased depending upon the fluid viscosity and the flexibility of the collapsible, sealed container used in combination with the dip tube.

Figure 3:
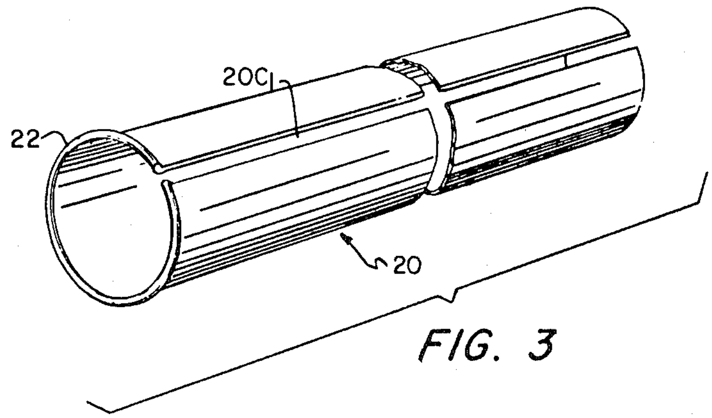
FIG. 3 is a perspective view of a second embodiment of the dip tube according the the present invention.

FIG. 3 illustrates another embodiment of the dip tube according to the present invention. The dip tube 20 includes a channel 20C$_1$ in the peripheral surface thereof extending along substantially the entire length of the dip tube. In addition, a deformed end 22 may be positioned at one end thereof to facilitate the attachment of the dip tube to the horizontal wall member 13 of the bag fitment 14 in the same manner as illustrated in FIG. 1. However, as previously discussed, other means of attaching the dip tube 20 to the bag fitment 14 are contemplated within the scope of the present invention. The dip tube 20 operates in the same manner as the dip tube 10 described above.

Figure 4:
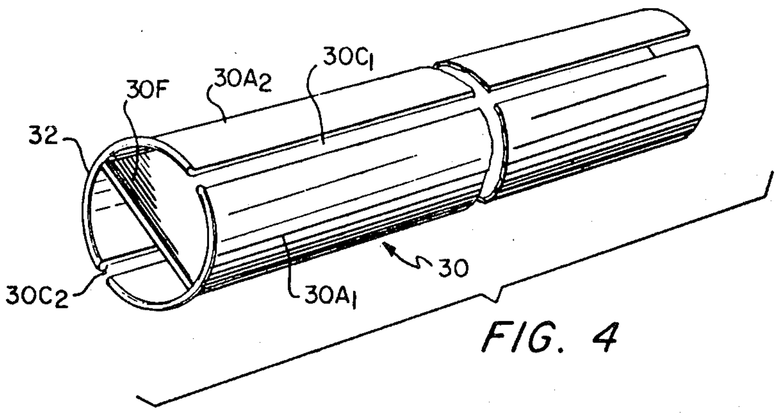
FIG. 4 is a perspective view of a third embodiment of the dip tube according to the present invention.

FIG. 4 illustrates another embodiment of the dip tube according to the present invention. The dip tube 30 includes two channels 30C$_1$, 30C$_2$ which are positioned in the peripheral surface thereof and extend along substantially the entire length of the dip tube. A frame 30F connects the skirt members 30A$_1$, 30A$_2$ together to form the channels 30C$_1$, 30C$_2$ therebetween. In addition, a deformed end 32 may be positioned at one end thereof to facilitate the attachment of the dip tube to the horizontal member 13 of the bag fitment member 14 in the same manner as illustrated in FIG. 1. Again, other means of attaching the dip tube 30 to the bag fitment 14 may be utilized without departing from the spirit and intent of the present invention.

Figure 5:
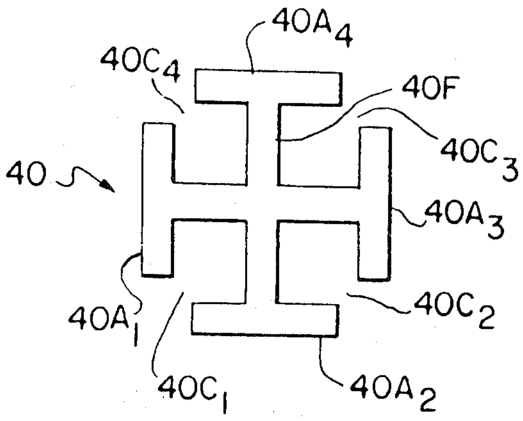
FIG. 5 is an end view of another embodiment of a dip tube according to the present invention.

FIG. 5 illustrates an end view of yet another embodiment according to the present invention. The dip tube 40 is shaped in the form of a square and includes skirt members 40A$_1$–40A$_4$ connected together by means of a frame 40F. The skirt members 40A$_1$–40A$_4$ are spaced relative to each other to form channels 40C$_1$–40C$_4$ in the peripheral surface of the dip tube 40 which extend substantially along the entire length of the dip tube. As discussed hereinabove, a suitable attachment member will be provided adjacent to one end of the dip tube for attachment to the bag fitment 14.

The various embodiments of the dip tube according to the present invention may be extruded, molded or manufactured in any manner suitable to obtain a dip tube with one or more channels extending substantially along the entire length thereof. In addition, any suitable material, for example, plastic, metal or other materials may be utilized in constructing the dip tube according to the present invention. Further, the dip tube according to the present invention may be constructed in a variety of shapes and is not limited to a circular, or square dip tube as illustrated in FIGS. 1–6. The number of channels in the peripheral surface of the dip tube according to the present invention is not limited to any particular number. The channels could be ten or more if desired.

FIGS. 7 to 13 illustrate various embodiments of a bag coupling member 50, valve assemblies retained within bag coupling member 50, and alternative means for retaining the dip tube 10 either within the bag coupling 50 or the bag fitment.

Referring in detail to FIG. 7, there is illustrated what shall be referred to hereinafter as a bag coupling 50, which performs essentially the same function as the bag coupling 17 of FIG. 1. That is, the bag coupling 50 houses a valve assembly and provides at its respective ends a quick-disconnect coupling between a bag fitment 54 and the hose coupling of a dispensing hose, to be discussed hereinafter.

As illustrated in FIG. 7 bag coupling 50 is open at both ends thereof, to permit the flow of fluid therethrough, and includes screw threads 50A about the periphery of the outer wall adjacent the top end of the coupling for receiving a screw-on hose coupling, a shoulder 50B for engaging the bottom edge of the hose coupling, a lower enlarged portion 50C which fits into a socket 54A of a bag fitment 54, and an annular sealing ring or rings 50D, which are sized for a force-fit within socket 54A.

Bag fitment 54 includes an annular flange 54B which is heat sealed or secured by other suitable means to a collapsible bag, generally indicated 16. Disposed within the bottom portion of socket 54A of fitment 54 is a spider 56. Spider 56 in a preferred embodiment, is molded as an integral part of the fitment 54. Within the bottom portion of the socket 54A, the spider 56 includes a centrally located, annular ring 56A which defines a hole or opening, through which a dip tube 10 is inserted into the container, and a plurality of radial spokes 56B. The center hole of the spider defined by annular ring 56A is large enough to allow dip tube 10 to be easily inserted, yet the large dip tube retainer washer 52 (or deformed dip tube end) does not let the dip tube fall through the opening into the bag. The central hole in spider 56 is sized so that the dip tube can also easily pivot as required. It can be observed with reference to FIG. 7 that once the bag coupling 50 containing the valve is inserted into socket 54 of the bag fitment, the dip tube 10 and retainer 52 are captivated or sandwiched between the bag coupling and the spider 56. The space between the radial spokes 56B of spider 56 permits the container, or collapsible bag, to be filled with liquid before the dip tube is inserted without impairing or restricting the flow of fluid. The spider is located at the bottom of the annular socket 54A of fitment 54 so that there is room for the coupling of a filling machine to seal on socket 54A without touching the spider. Thus, the spider 56 may be maintained in a substantially sterile condition. The use of the spider 56 eliminates the need for an extra part or element for supporting the dip tube 10 in the bag fitment 54.

Figure 8:
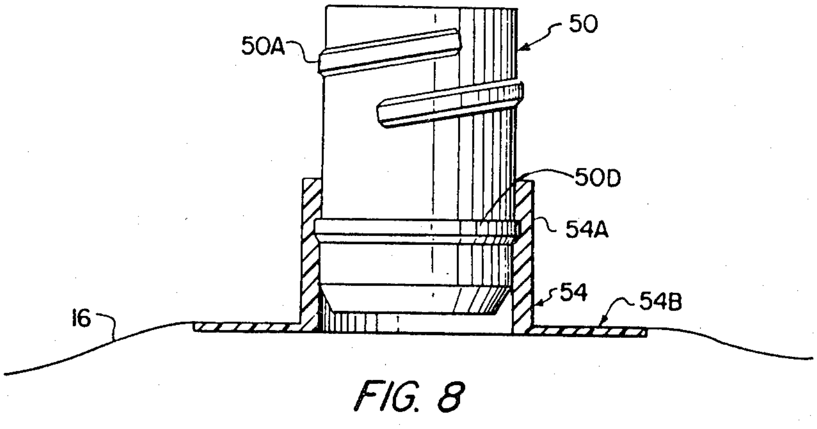
FIG. 8 is a side elevational view of an alternative embodiment of the bag coupling member of FIG. 1.

FIG. 8 illustrates another form of a bag coupling 50 in an inserted, sealed condition within bag fitment 54 of the collapsible bag 16. In this embodiment bag coupling 50 has substantially the same diameter from top to bottom.

FIGS. 9 and 10 are cross-sectional views illustrating the internal features of the bag coupling 50 of FIG. 8 in closed and open positions, respectively with the valve assembly 60. The bag coupling 50, which in a preferred embodiment is molded from plastic, functions as the body of the valve assembly. A spring-loaded poppet 60 is disposed within the valve body, and is normally biased to a closed position, wherein frusto-conical valve member 62 is sealingly engaged in the opening 63, under the action of integrally molded spring 66 which terminates in a ring-shaped base 70. The base 70 of spring 66 is mounted in a groove in the inside wall of bag coupling 50. The valve assembly further includes an inner poppet stem 64 which is integrally molded with elements 62, 66 and 70. An outer stem 68 is integrally molded within the bag coupling 50, and is supported centrally thereof, by means of radial spokes 68A (FIG. 9A) in the provision of fluid passages 67 about the periphery thereof.

As illustrated in FIG. 9, the spring-loaded poppet 60 is normally seated in opening 63 to preclude the flow of fluid through the valve body of bag coupling 50. On the other hand, FIG. 10 illustrates the spring-loaded poppet 60 in its actuated condition in response to the insertion of a mating coupling 72 onto the top of the bag coupling 50. Mating coupling 72 may be a conventional quick-disconnect coupling, as is illustrated in the Post-mix beverage industry for coupling the well known "FIGAL" syrup containers to the dispensing machinery. The top of coupling 72 includes a serrated hose connection 76, and the bottom includes a downwardly extending skirt 74 which fits over the side walls of bag coupling 50. Coupling 72 may be screwed onto bag coupling 50 by means of threads 50A. As illustrated in FIG. 10, when mating coupling 72 is screwed into position, it depresses the inner valve poppet stem 64 to compress spring 66 and move frusto-conical valve element 62 out of sealing engagement with bore 63. The outer stem 68 presses up into coupling 72 against valve member 72A to open the same. Thus, all valves are open in the respective couplings, and fluid is free to flow from the bottom of bag coupling 50, through its interior and that of coupling 72, and out through the hose connection 76 to the dispensing apparatus.

The pair of stems 64 and 68 offer a unique advantage, in that the center stem 64 of the spring-loaded poppet when depressed by the mating coupling 72, opens the valve in the bag coupling, while the outer stem 68 serves to open the valve element 72A within the mating coupling. Accordingly, the spring 66 of the spring-loaded poppet does not have to be strong enough to open the poppet 72A of the mating coupling 72, since the outer stem 68 which is fixedly mounted with respect to bag coupling 50, performs this operation. Since the fixed outer stem 68 is capable of operating very strong mating coupling springs, such as would be desirable in a coupling 72, it is possible to use a variety of designs of mating couplings 72 with the bag coupling 50 of the present invention. This offers the additional advantage that the strong springs in the mating coupling allow the provision of a very strong seal against the high vacuum created by the dispensing system. If the outer stem 68 were not provided, then the poppet spring 66 would have to be strong enough to open the mating coupling, or the poppet spring assembly, after opening, would have to bottom-out on a fixed restraint, so that the poppet stem could then open the poppet of the mating coupling. This, of course, would be undesirable because an additional part would be required, adding to the complexity of the bag coupling assembly.

In a preferred embodiment, the entire bag coupling 50, and spring-loaded poppet 60, are molded from relatively inexpensive plastic material and thus, would be disposable if so desired.

As illustrated in the embodiments of FIGS. 9 and 10, the biasing spring 66 of the poppet 60 has a pair of spiral legs which terminate in a ring-shaped base 70. Thus, the spring 66 is similar in shape to a coil spring, which permits the free and unobstructed flow of fluid therethrough.

An alternative embodiment of the spring is illustrated in FIG. 11. As illustrated in FIG. 11, the spring 80B is merely an extension of the frusto-conical sealing member 80, and includes a plurality of folds, resulting in a substantially cylindrical bellows configuration. An inner poppet stem 80A, is also provided and functions in a similar manner to the poppet stem 64 of the embodiment of FIGS. 9 and 10. The bottom of the cylindrical spring element 80B of FIG. 11 terminates in an annular flange 80C which is mounted in the inside walls of bag coupling 50 adjacent the bottom thereof in a suitable groove. Flange 80C includes a plurality of fluid passages 82 disposed about its circumference to permit the free flow of liquid. The valve assembly of FIG. 11 functions in substantially the same manner as the valve assembly in the embodiments of FIGS. 9 and 10.

Figure 12:
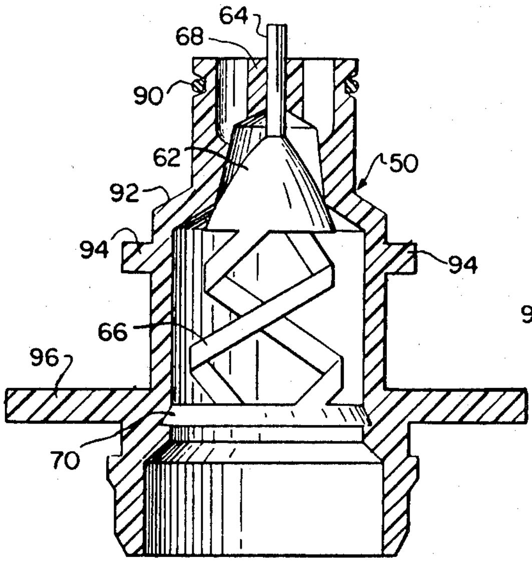
FIG. 12 is a cross-sectional view of still another embodiment of the bag coupling of the present invention illustrating the valve of FIGS. 9 and 10 therein.

Referring to FIG. 12, there is illustrated a bag coupling 50 including the spring poppet embodiment of FIGS. 9 and 10. The bag coupling 50 of FIG. 12 has a slightly different external configuration to facilitate the use of a different form of mating coupling, namely, one that snaps onto the top of bag coupling 50, rather than screwing onto the coupling. The top of the bag coupling 50 of FIG. 12 has a reduced diameter, which extends down to an enlarged shoulder portion 92, and a plurality of outwardly extending pins 94. Thus, when a mating coupling is connected to the reduced end of bag coupling 50, it sealingly engages with the top thereof with an "O" ring seal 90, and connects to the outwardly extending pins 94 in the fully coupled position. The coupling 50 of the embodiment of FIG. 4 is further provided with an enlarged flange 96 which permits the coupling to be supported by an operator's hand for insertion into a bag fitment or while being attached to a mating coupling.

Figure 13:
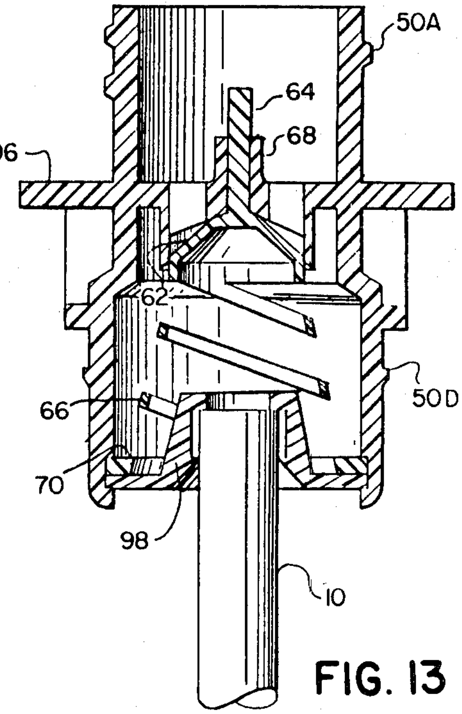
FIG. 13 is a cross-sectional view of yet another embodiment of the present invention illustrating a dip tube retained in the valve body.

Referring to FIG. 13, there is illustrated a bag coupling 50 including a spring-loaded poppet 60 of the type illustrated in FIGS. 9 and 10, with a dip tube 10 supported in the bottom of bag coupling 50 or valve body, by means of a dip tube retainer 98. Dip tube retainer 98 is a one-way slidable washer, as previously described in the embodiment of FIG. 6. However, in the FIG. 13 embodiment the dip tube retainer washer supports dip tube 10 in the bottom of the valve body, (bag coupling 50) rather than in the bag fitment. There are distinct advantages to supporting the dip tube in the valve body or valve coupling 50 rather than in the bag fitment. For example, the valve/dip tube assembly of FIG. 13 can be inserted into the bag fitment, and collapsible bag 16, without contaminating the dip tube 10 or parts of the bag coupling 50, which contact the product by means of the flange 96. In addition, the valve/dip tube assembly of FIG. 13 can be used with standard bags, spouts or fitments without the need for a spider type retainer, such as 56 of FIG. 7. Thus, filling of the bag through the spout or fitment is not in the least impaired. A further advantage is that the valve/dip tube assembly of FIG. 13 can be shipped from the supplier to the bag filling location as one assembly, and no secondary assembly steps need take place at the bag filling facility.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a system for dispensing syrup from a container, said container including a fitment for defining an opening through which said syrup passes, the improvement comprising:

a first coupling member having first and second open ends connected by a central bore, said second open end being connected to said fitment;

a first self-sealing valve disposed in said central bore including means in said bore defining a valve seat, a valve member movable into or out of sealing engagement with said valve seat, spring means for normally biasing said valve member into sealing engagement with said valve seat, and a first actuating stem coupled to said valve member and extending toward said first open end of said first coupling member;

a second actuating stem rigidly affixed in said bore inboard of the walls thereof adjacent said first actuating stem and extending toward said first open end of said first coupling member, said second actuating stem being supported at the center of a plurality of radial spokes extending from and affixed to said bore walls, said radial spokes defining fluid flow openings therebetween, said second actuating stem having a channel therethrough for guiding and supporting said first actuating stem; and a second coupling member for engaging said first open end of said first coupling member, said second coupling member including means for engaging said first actuating stem to move said valve member out of engagement with said valve seat when said first and second coupling members are fully engaged and a second self-sealing valve which is opened by said second actuating stem when said first and second couplings are fully engaged.

2. The system of claim 1 wherein said spring means is an integrally molded extension of said valve member.

3. The system of claim 2 wherein said spring means comprises at least one serpentine leg extending from said valve member and terminating in an integrally formed annular ring, said annular ring being secured to the wall of said central bore on the side of said valve seat toward said second open end of said first coupling member.

4. The system of claim 2 wherein said spring means comprises a cylindrical sleeve with a plurality of anualr folds said sleeve being integrally formed with said valve member and extending therefrom toward said second open end of said first coupling member, said sleeve having a flange secured to the wall of said central bore with fluid passages therein.

5. The system of claims 1 or 2, wherein said valve member has a frusto-conical shape.

6. The system of claims 1 or 2, wherein said valve member, first actuating stem, and spring means are integrally molded from plastic.

7. The system of claim 1 wherein said first self-sealing valve is wholly contained within said central bore of said first coupling member so that said first actuating stem does not extend beyond said first open end in any operative positions of said stem.

8. The system of claim 7, wherein said channel in said second actuating stem is of a sufficient length to substantially fully support said first actuating stem in all operative positions thereof.

9. The system of claim 1, wherein said channel in said second actuating stem is of a sufficient length to substantially fully support said first actuating stem in all operative positions thereof.

* * * * *